(12) United States Patent
Wang

(10) Patent No.: US 12,042,962 B2
(45) Date of Patent: Jul. 23, 2024

(54) VR FACE MASK AND MANUFACTURING METHOD THEREOF

(71) Applicant: Qingdao Pico Technology Co., Ltd., Qingdao (CN)

(72) Inventor: Zishang Wang, Beijing (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 18/094,208

(22) Filed: Jan. 6, 2023

(65) Prior Publication Data

US 2023/0157387 A1 May 25, 2023

Related U.S. Application Data

(63) Continuation of application No. PCT/CN2022/106286, filed on Jul. 18, 2022.

(30) Foreign Application Priority Data

Aug. 25, 2021 (CN) .......................... 202110983665.9

(51) Int. Cl.
*B29C 44/12* (2006.01)
*B32B 27/06* (2006.01)
(Continued)

(52) U.S. Cl.
CPC ...... *B29C 44/1276* (2013.01); *B29C 44/1271* (2013.01); *B32B 27/065* (2013.01);
(Continued)

(58) Field of Classification Search
CPC .. A41D 13/11; A41D 13/1107; B29C 43/146; B29C 43/203; B29C 44/1271;
(Continued)

(56) References Cited

U.S. PATENT DOCUMENTS

| 10,545,349 B1* | 1/2020 | Sullivan ................. B29C 43/52 |
| 2012/0027982 A1* | 2/2012 | Lee .......................... B32B 3/04 |
| | | 428/71 |

(Continued)

FOREIGN PATENT DOCUMENTS

| CN | 206058056 U | 3/2017 |
| CN | 206994575 U | 2/2018 |

(Continued)

OTHER PUBLICATIONS

English machine translation provided by WIPO translation of the description of CN 208741278. (Year: 2019).*

(Continued)

*Primary Examiner* — Joshua Lee
(74) *Attorney, Agent, or Firm* — Astute IP Law Group

(57) ABSTRACT

The present disclosure provides a VR face mask and a manufacturing method thereof. The VR face mask includes a mask body, and a first PU covering layer arranged on a surface of the mask body to be attached close to a human face. The mask body includes a mask bottom layer arranged away from the first PU covering layer, and a filling layer arranged between the first PU covering layer and the mask bottom layer.

11 Claims, 2 Drawing Sheets

(51) Int. Cl.
*B32B 27/40* (2006.01)
*B29K 75/00* (2006.01)
*B29K 105/04* (2006.01)
*B29L 31/48* (2006.01)
*G02B 27/01* (2006.01)

(52) U.S. Cl.
CPC ........ *B32B 27/40* (2013.01); *B29C 2793/009* (2013.01); *B29K 2075/00* (2013.01); *B29K 2105/04* (2013.01); *B29L 2031/4835* (2013.01); *G02B 27/0176* (2013.01)

(58) Field of Classification Search
CPC ... B29C 44/1276; B29C 44/14; B29C 44/145; B29C 44/146; B29C 44/16; B29C 2793/009; B29K 2075/00; B29K 2105/04; B29L 2009/00; B29L 2031/4835; B32B 27/065; B32B 27/08; B32B 27/40; G02B 27/01; G02B 27/0176
See application file for complete search history.

(56) References Cited

U.S. PATENT DOCUMENTS

| 2017/0132845 A1* | 5/2017 | Everman, II | G06F 3/017 |
| 2018/0067547 A1* | 3/2018 | Russell | G02B 27/0172 |
| 2020/0400963 A1* | 12/2020 | Liu | B29C 45/14467 |
| 2021/0263323 A1* | 8/2021 | Ellis | G06F 1/163 |

FOREIGN PATENT DOCUMENTS

| CN | 208324402 U | | 1/2019 |
| CN | 208741278 U | | 4/2019 |
| CN | 210835440 U | * | 6/2020 |
| CN | 211348861 U | | 8/2020 |
| CN | 113715249 A | | 11/2021 |
| TW | 200817170 A | | 4/2008 |
| TW | 201204540 A | | 2/2012 |
| WO | 2019071590 A1 | | 4/2019 |

OTHER PUBLICATIONS

English translation of the description of CN 210835440 U. (Year: 2020).*

First Office Action and Search in CN202110983665.9, mailed Jan. 29, 2023, 7 pages.

International Search Report issued in corresponding International Application No. PCT/CN2022/106286 dated Oct. 17, 2022.

Second Office Action in CN202110983665.9, mailed Aug. 7, 2023, 3 pages.

* cited by examiner

VR FACE MASK AND MANUFACTURING METHOD THEREOF

CROSS-REFERENCE TO RELATED APPLICATIONS

The present application is a continuation of International Application No. PCT/CN2022/106286, filed on Jul. 18, 2022, which claims priority to Chinese patent application No. 202110983665.9, filed on Aug. 25, 2021 and entitled "VR FACE MASK AND MANUFACTURING METHOD THEREOF", the entire contents of which are incorporated here by reference.

TECHNICAL FIELD

The present disclosure relates to the technical field of virtual reality (VR), and more specifically relates to a VR face mask and a manufacturing method thereof.

BACKGROUND

A virtual reality (VR) technology is a brand-new practical technology developed in the 20th century. The virtual reality technology includes computer, electronic information, and simulation technologies, and its basic implementation mode is that computers simulate virtual environments to give people a sense of environmental immersion.

The existing VR face mask usually adopts the following three forms: 1. a layer of thin sponge is attached to a prefabricated plastic bracket, as shown in FIG. 1, in which the upper part is a foam part 1' (thin sponge), and the lower part is a plastic bracket part 2', which can also be regarded as a part of the whole product; the foam can be connected to the bracket by gluing or by wrapping with a PU (polyurethane) covering, etc., to form the VR face mask; 2. the VR face mask is manufactured by means of cloth plus sponge (that is, preformed sponge is wrapped with cloth to form the face mask); and 3. the VR face mask is manufactured from silica gel.

However, the three types of existing VR face masks have corresponding technical defects thereof. For example, a manufacturing method of attaching a layer of thin sponge to a plastic bracket has the technical defects of poor appearance, no sense of integrity, difficulty in adjustment of hardness, and difficulty in cleaning. A manufacturing method of cloth plus sponge has technical defects of poor stereoscopic impression, uneasy control on a supporting effect, and difficulty in cleaning. A method of directly manufacturing the VR face mask from silica gel has the main technical defect of poor supporting effect.

Based on the above technical problems of several existing VR face masks, a VR face mask with a new structure and a manufacturing method thereof are urgently needed.

SUMMARY

In view of the above problems, the purpose of the present disclosure is to provide an easy-to-clean VR face mask with a good supporting effect, and a manufacturing method thereof.

A virtual reality (VR) face mask provided by the present disclosure includes a mask body, and a first polyurethane (PU) covering layer arranged on a surface of the mask body to be attached close to a human face. The mask body includes a mask bottom layer arranged away from the first PU covering layer, and a filling layer arranged between the first PU covering layer and the mask bottom layer.

In addition, in a preferred embodiment, the filling layer is a foamed filling layer, and the mask bottom layer is a crust layer formed by the foamed filling layer through a crusting process.

In addition, in a preferred embodiment, the mask bottom layer is a second PU covering layer, and the filling layer is a foamed filling layer.

In addition, in a preferred embodiment, the first PU covering layer is a screen-printed PU covering layer, the mask bottom layer is a cloth layer, and the filling layer is a sponge layer.

In addition, in a preferred embodiment, the first PU covering layer and the mask bottom layer are each a screen-printed PU covering layer, and the filling layer is a sponge layer.

In addition, the present disclosure further provides a manufacturing method of the above-mentioned VR face mask, including: preparing the first PU covering layer; placing the first PU covering layer in a foaming mold to perform foam forming of the foamed filling layer on one side of the first PU covering layer; and forming the crust layer on a side of the foamed filling layer facing away from the first PU covering layer through the crusting process.

In addition, in a preferred embodiment, the manufacturing method further includes, subsequent to said forming the crust layer: trimming the foamed filling layer to form the VR face mask.

In another aspect, the present disclosure further provides a manufacturing method of the above-mentioned VR face mask, including: preparing the first PU covering layer and the second PU covering layer; and placing the first PU covering layer and the second PU covering layer in a foaming mold to form the foamed filling layer between the first PU covering layer and the second PU covering layer.

In still another aspect, the present disclosure further provides a manufacturing method of the above-mentioned VR face mask, including: preparing the first PU covering layer; stacking the first PU covering layer and the sponge layer, and performing hot-press forming; and arranging the cloth layer on a side of the formed sponge layer facing away from the first PU covering layer.

In addition, in a preferred embodiment, the manufacturing method further includes, prior to said stacking the first PU covering layer and the sponge layer, and said performing the hot-press forming: performing preliminary hot-press forming on the first PU covering layer.

Beneficial Effects

Compared with the related art, the VR face mask according to the present disclosure has the following beneficial effects.

Whether it is one-sided PU plus foaming or double-sided PU plus foaming, the VR face mask according to the present disclosure can be well formed with stereoscopic impression close to the design; the formed VR face mask has good integrity and aesthetic property; in addition, due to the use of PU, the hardness is adjustable; and as the side close to the face is PU, it is very convenient to clean. In addition, the face mask is formed with the one-sided or double-sided PU through the foaming process, which perfectly achieves the original design intention; and compared with an existing manner of cloth plus sponge, a manner of the one-sided or double-sided screen-printed PU plus the sponge improves the cleanability of the face mask.

In order to achieve the above and related purposes, one or more aspects of the present disclosure include features which will be described in detail later and particularly recited in the claims. The following description and the accompanying drawings illustrate some exemplary aspects of the present disclosure in detail. However, these aspects are indicative of only some of the various ways in which the principles of the present disclosure can be used. Furthermore, the present disclosure is intended to include all these aspects and their equivalents.

BRIEF DESCRIPTION OF DRAWINGS

Other objects and results of the present disclosure will be more apparent and easier to understand by referring to the following description in conjunction with the accompanying drawings and the contents of claims, and with a more complete understanding of the present disclosure. In the drawings:

Figure 1:
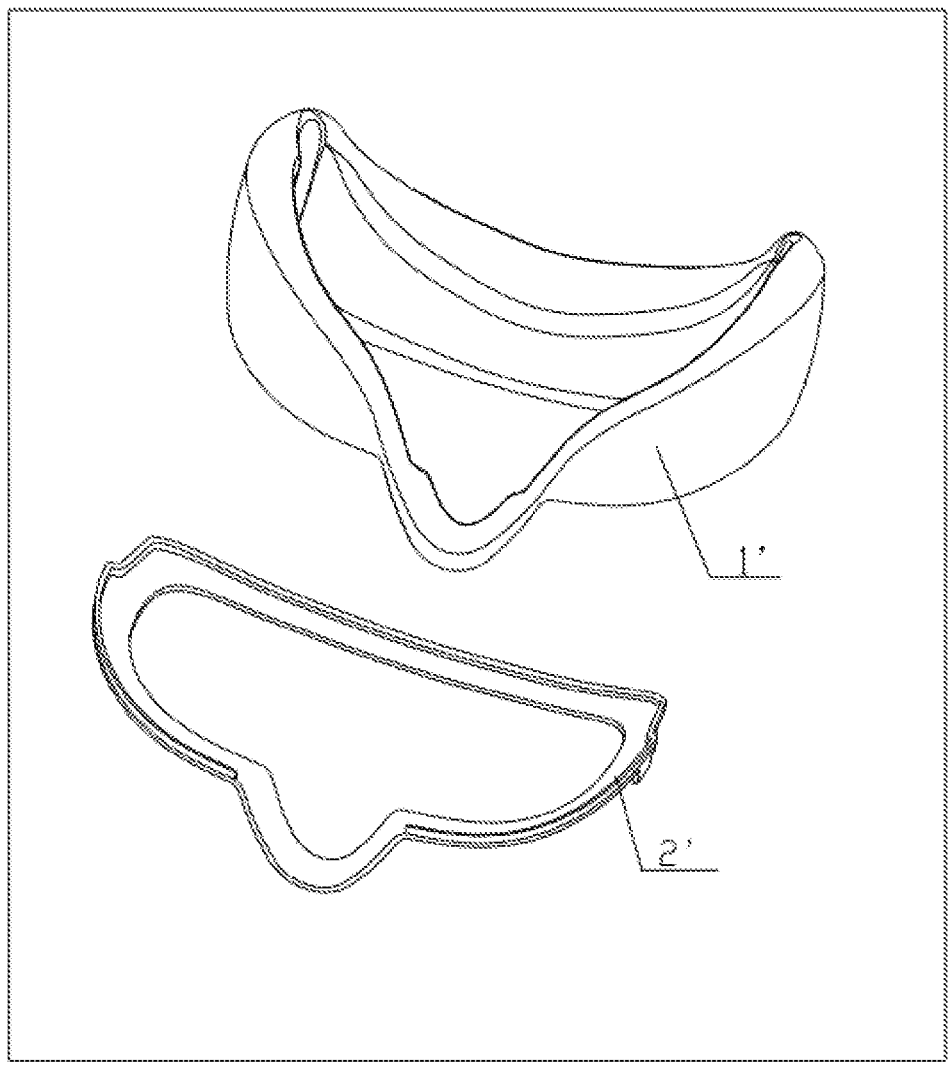
FIG. 1 is a structural diagram of an existing VR face mask.

Reference numerals in the drawings: first PU covering layer 11, and mask bottom layer 12.

In all the accompanying drawings, identical reference numerals indicate similar or corresponding features or functions.

DESCRIPTION OF EMBODIMENTS

In the following description, for the purpose of explanation, lots of specific details are set forth in order to provide a comprehensive understanding of one or more embodiments. However, it is apparent that these embodiments can also be implemented without these specific details. In other examples, in order to facilitate the description of one or more embodiments, known structures and equipment are shown in the form of a block diagram.

It should be noted that in the description of the present disclosure, orientation or position relations indicated by the terms "center", "on/above", "under/below", "left", "right", "vertical", "horizontal", "inner", "outer" and the like are based on the orientation or position relations shown in the accompanying drawings, and are only used for facilitating the description of the present disclosure and simplifying the description, instead of indicating or implying that indicated devices or elements must have specific orientation and must be constructed and operated in specific orientation, so that they should not to be construed as a limitation to the present disclosure. The terms "first", "second", and "third" are used for descriptive purposes only and are not to be construed as indicating or implying relative importance. Furthermore, unless expressly specified and defined otherwise, the terms "mounted", "connected", and "jointed" should be interpreted broadly, e.g., as fixedly connected, detachably connected, or integrally connected; mechanical connected or electrically connected; and directly connected, indirectly connected through an intermediate medium, or communication of interiors of two elements. For people of ordinary skill in the art, the specific meanings of the above terms in the present disclosure can be understood according to specific situations.

Figure 2:
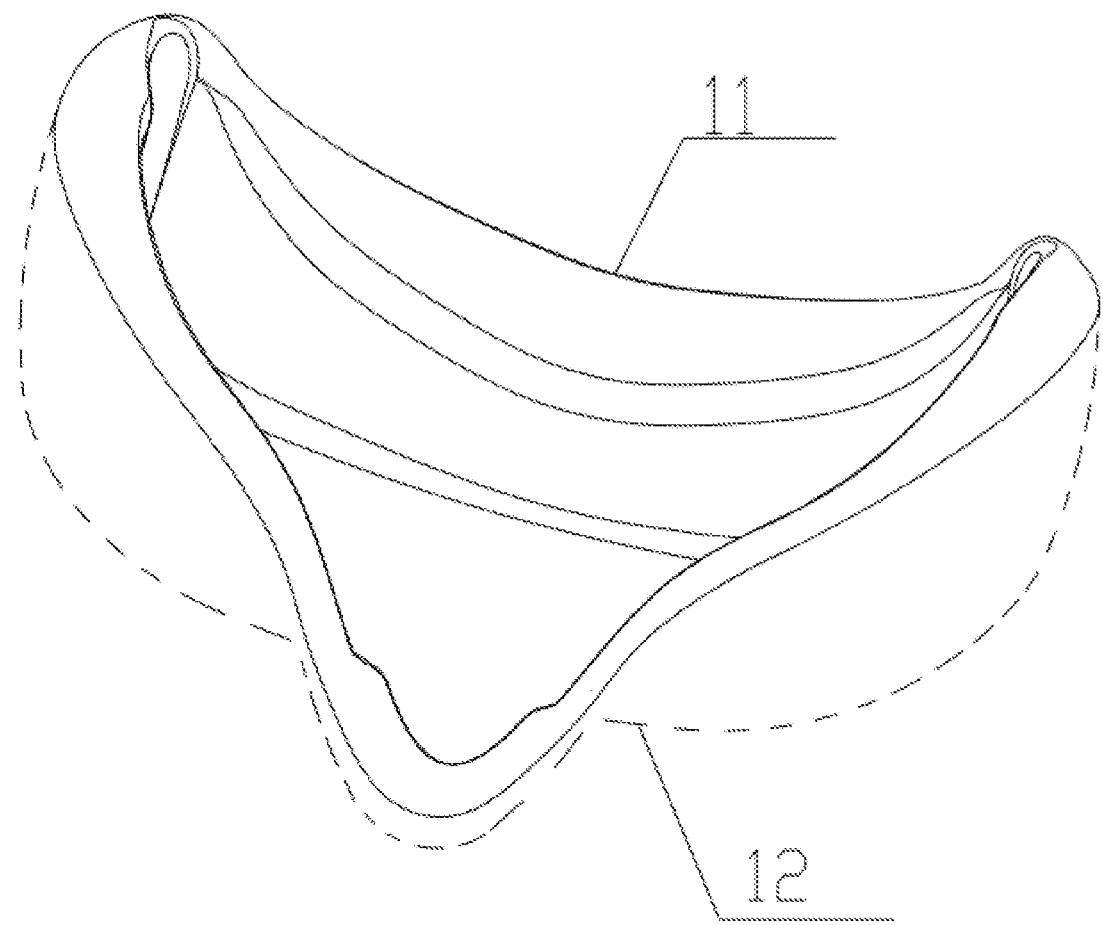
FIG. 2 is a structural diagram of a VR face mask according to embodiments of the present disclosure.

FIG. 2 shows a structure of a virtual reality (VR) face mask according to embodiments of the present disclosure. As shown in FIG. 2, the VR face mask provided by the present disclosure includes a mask body with a supporting effect, and a first PU covering layer 11 arranged on a surface of the mask body to be attached close to a human face.

It should be noted that PU is polyurethane, and PU is an artificial synthetic material with the texture of genuine leather, and is very tough and durable, low in price, and easy to clean. In the actual use process, the first PU covering layer 11 is used to contact the human face, so that the comfort level for the face contact can be significantly improved, and cleaning is convenient. In addition, superfine fibers can be added to the PU, so that the toughness, air permeability, and wear resistance of the polyurethane are further strengthened.

Specifically, the mask body includes a mask bottom layer 12 arranged away from the first PU covering layer 11 and a filling layer arranged between the first PU covering layer 11 and the mask bottom layer 12. The filling layer is arranged to improve the stereoscopic impression of the whole VR face mask.

In addition, in order to reduce the weight of the whole device and the weight-bearing feeling of the user's head on the premise of ensuring the integrity and stereoscopic impression of the formed VR face mask, a foamed filling layer can be selected as the filling layer. In addition, in order to reduce the manufacturing processes, the mask bottom layer 12 can be directly formed through a crusting process, that is, after the foamed filling layer is formed, the crust layer is formed on a surface of the foamed filling layer facing away from the first PU covering layer 11 through the crusting process; and the crust layer is used to replace the mask bottom layer 12.

In addition, in another preferred embodiment of the present disclosure, the VR face mask can be designed as a structure of double-sided PU plus a foamed layer therebetween. Specifically, the mask bottom layer 12 is set as a second PU covering layer, and the filling layer is set as a foamed filling layer. It should be noted that compared with the VR face mask with a one-sided PU structure, the VR face mask with the double-sided PU structure has further improved integrity and aesthetic property due to the use of the second PU covering layer instead of the crust layer on the premise of ensuring the stereoscopic impression and the sense of integrity.

In another aspect, in a third preferred embodiment of the present disclosure, the screen-printed PU covering can be used to manufacture the first PU covering layer 11, a cloth layer can be used to manufacture the mask bottom layer 12, and a sponge layer can be selected to manufacture the filling layer. It should be noted that the screen-printed PU covering is achieved by adding the screen printing process to the manufacturing process of the PU covering, which forms a PU covering with a screen-printed structure on the surface. Compared with the traditional PU covering, the screen-printed PU covering has a better support performance and is easier to clean.

Of course, the VR face mask manufactured with the cloth layer, the sponge layer and the screen-printed PU covering layer can not only ensure relatively strong stereoscopic impression, but also has a relatively low manufacturing cost due to the use of cloth and sponge.

In addition, in order to improve the integrity and aesthetic property of the VR face mask in the third preferred embodiment, the mask bottom layer 12 can also be set as a screen-printed PU covering layer, and in order to save the cost, the sponge layer is still selected as the filling layer.

To further explain the above-mentioned various VR face masks provided by the present disclosure, the specific structures of the above-mentioned various VR face masks are described in detail in turn below.

Specifically, for a first VR face mask with the one-sided PU structure, the manufacturing method thereof includes: preparing the first PU covering layer 11; placing the first PU covering layer 11 in a foaming mold to perform foam forming of the foamed filling layer on one side of the first PU covering layer 11; and trimming the foamed filling layer (by laser) to form the VR face mask.

Specifically, the process of preparing the first PU covering layer 11 includes: PU covering pre-press forming, baking and shaping, and finally cooling, thereby forming the first PU covering layer 11.

It should be noted that in the process of preparing the first PU covering layer 11, the stretching and positioning of the PU covering during the pre-press forming, the temperature and time for the baking and shaping, and the temperature and time for the foaming are particularly important, and directly affect the product performance of the formed first PU covering layer 11, so they need to be strictly controlled. Of course, the specific values of these parameters will be different depending on different preparation instruments and products with different structures, which will not be elaborated again.

Specifically, for the first VR face mask with the one-sided PU structure, after the foamed filling layer is formed, the crust layer is formed on a side of the foamed filling layer facing away from the first PU covering layer 11 through a crusting process, and is used as the mask bottom layer 12.

In another aspect, for the second VR face mask with the double-sided PU structure, the manufacturing method thereof includes: preparing the first PU covering layer 11 and the second PU covering layer; placing the first PU covering layer and the second PU covering layer in a foaming mold to form the foamed filling layer between the first PU covering layer and the second PU covering layer; and trimming the foamed filling layer (by laser) to form the VR face mask.

In another aspect, the manufacturing method of the VR face mask with the one-sided screen-printed PU covering layer structure includes: preparing the first PU covering layer 11; stacking the first PU covering layer 11 and the sponge layer, and performing hot-press forming; and arranging the cloth layer on a side of the formed sponge layer facing away from the first PU covering layer 11.

It should be noted that the forming of screen-printed PU can be one-time forming or multiple-time forming. For the one-time forming, a screen-printed PU layer and a sponge layer are stacked and placed in a hot-press forming mold, followed by hot pressing and pressure-holding forming, to form the first PU covering layer 11 (which is the screen-printed PU covering layer). For the multiple-time forming, firstly a screen-printed PU layer is subjected to hot-press forming, and the formed screen-printed PU layer and the sponge layer are subjected to hot-press forming together. Corresponding to the above steps, before the first PU covering layer 11 and the sponge layer are stacked and subjected to hot-press forming, preliminary hot-press forming is performed on the first PU covering layer 11.

It can be seen from the above specific embodiments that the VR face mask and the manufacturing method thereof provided by the present disclosure have at least the following advantages:

1. whether it is one-sided PU plus foaming or double-sided PU plus foaming, better stereoscopic impression close to the design can be provided;
2. the formed VR face mask has good integrity and aesthetic property; in addition, due to the use of PU plus the foamed layer, it is easy to adjust the hardness;
3. compared with the existing manner of cloth plus sponge, a manner of the one-sided or double-sided screen-printed PU plus the sponge improves the cleanability of the face mask.

The VR face mask according to the present disclosure is described by way of the embodiments with reference to FIG. 1 and FIG. 2, as above. However, those skilled in the art should understand that various improvements can be made to the VR face mask provided by the present disclosure without departing from the content of the present disclosure. Therefore, the scope of protection of the present disclosure should be determined by the appended claims.

What is claimed is:

1. A virtual reality (VR) face mask, comprising:
a mask body; and
a first polyurethane (PU) covering layer arranged on a surface of the mask body to be attached close to a human face,
wherein the mask body comprises a mask bottom layer arranged away from the first PU covering layer, and a filling layer arranged between the first PU covering layer and the mask bottom layer,
wherein the first PU covering layer comprises superfine fibers,
wherein the filling layer is a foamed filling layer, and
wherein the mask bottom layer is a crust layer formed by the foamed filling layer.

2. The VR face mask according to claim 1, wherein the first PU covering layer is a screen-printed PU covering layer.

3. A manufacturing method of the VR face mask according to claim 2, the manufacturing method comprising:
preparing the first PU covering layer;
stacking the first PU covering layer and the sponge layer, and performing hot-press forming; and
arranging the cloth layer on a side of the formed sponge layer facing away from the first PU covering layer.

4. The manufacturing method of the VR face mask according to claim 3, the manufacturing method further comprising, prior to said stacking the first PU covering layer and the sponge layer, and said performing the hot-press forming:
performing preliminary hot-press forming on the first PU covering layer.

5. The VR face mask according to claim 1, wherein the first PU covering layer is a screen-printed PU covering layer.

6. A manufacturing method of the VR face mask according to claim 1, the manufacturing method comprising:
preparing the first PU covering layer;
placing the first PU covering layer in a foaming mold to perform foam forming of the foamed filling layer on one side of the first PU covering layer; and
forming the crust layer on a side of the foamed filling layer facing away from the first PU covering layer through the crusting process.

7. The manufacturing method of the VR face mask according to claim 6, the manufacturing method further comprising, subsequent to said forming the crust layer:
trimming the foamed filling layer to form the VR face mask.

8. A manufacturing method of the VR face mask according to claim 1, the manufacturing method comprising:
preparing the first PU covering layer and the second PU covering layer; and placing the first PU covering layer and the second PU covering layer in a foaming mold to form the foamed filling layer between the first PU covering layer and the second PU covering layer.

9. A virtual reality (VR) headset device, comprising the VR face mask according to claim 1.

10. The VR headset device according to claim 9, wherein the first PU covering layer is a screen-printed PU covering layer.

11. The VR headset device according to claim 9, wherein the first PU covering layer is a screen-printed PU covering layer.

* * * * *